Patented Sept. 28, 1943

2,330,664

UNITED STATES PATENT OFFICE 2,330,664

OXIDATION CATALYST

Owen G. Bennett and Alfred Van Andel, Forest Hills, Pa., assignors to Carbon Monoxide Eliminator Corp., Pittsburgh, Pa.

No Drawing. Application June 13, 1941, Serial No. 397,866

14 Claims. (Cl. 252—212)

This invention relates to a catalytic oxidation process and particularly to a catalyst and a process involving the use of the catalyst to eliminate combustible constituents from a fluid such as exhaust gas of an internal combustion engine or in certain ambient atmospheres containing combustibles where this type of process is applicable.

The improved catalyst has an advantageous application in the continuous oxidation of vapors or gases at elevated temperatures comparable to the temperatures of exhaust gases of an internal combustion engine during all phases of engine operation. This result requires for best results a high temperature catalyst active at relatively lower temperatures comparable to the temperatures of the exhaust gas at the starting of the engine as well as being active at the normal high operating gas temperatures to efficiently and substantially completely oxidize the combustible constituents and during ordinary intermittent operation of the engine as when in use in propelling a vehicle.

Heretofore, an oxidation catalyst active at the high temperatures considered requires the material of the catalyst be heated to a normal operating exhaust gas temperature before it is sufficiently active to completely oxidize the combustibles contained in the exhaust mixture. To include some auxiliary means for heating the material to the required high temperature is disadvantageous, particularly where catalysts are used intermittently and the amount of heat necessary to provide adequate activity is large, because of the time interval required for heating, resulting in complete oxidation, and the difficulty and expense of heating the catalyst. To raise the temperature of the catalyst material by the heat contained in the exhaust gas is slow and large amounts of combustibles are discharged to the atmosphere before the material becomes sufficiently active. This condition defeats the principal purpose of complete oxidation and removal of combustibles from exhaust gas and especially since the starting cycle of operation of the types of engines contemplated may be frequent.

An object of this invention is to provide a high temperature catalyst material having a relatively low starting temperature at which and above which the material is active to substantially completely oxidize combustibles in an oxygen containing atmosphere and a process of catalytic oxidation particularly adaptable to the substantially complete oxidation of combustible constituents in exhaust gas of an internal combustion engine at all gas temperatures of engine operation including initial or starting exhaust gas temperature.

The relatively low starting temperature of activity of the catalyst of our invention makes the material effective to almost instantly oxidize substantially completely combustibles in the mixture when subjected to a flow of exhaust gases as when beginning operation of the engine which is a material improvement in lessening the obnoxious and harmful effects of this rapidly increasing source of contamination of the atmosphere. Furthermore, continuous or intermittent use of the catalyst and high temperatures do not affect the activity of the material since use for a period over six months has not evidenced any noticeable deterioration and the useful life of the material beyond this time has not been precisely determined.

After considerable experimentation and representing a feature of this invention, the catalyst provided is composed of a mixture of high temperature oxidizing catalyst materials and the resulting substance, whether by the principle of promotion or other influence, reduces the initial temperature of reasonably high activity of the mixture materially below that of any of the constituents and such property is not affected by use for reasonably long periods of time.

It is necessary in the manufacture of our improved catalyst that each of the metals or oxides selected be of metals which are themselves high temperature oxidation catalysts and this limitation places a definite region of selection of metals as understood in the art. Also, the metals selected must contain a mixture of the so-called platinum group of metals, platinum and palladium in equal proportions by weight, and for the purpose of exhaust gas oxidation, this mixture provides improved lower temperature results over the activity of either constituent. Preferably, an oxide of a metal of the group comprising copper, manganese, iron, cobalt and nickel is to be added to the mixture of the platinum metals for obtaining the most improved results of increased activity at lower temperatures. The mixture must be of finely divided substances and activated prior to mixture or by the formation of the mixture in order to produce the active centers for catalyzation. It is preferred that the mixture be produced before or during activation because it provides a more uniform mixture and what appears to be increased catalytic effect.

It is known that the individual metals of the platinum group are good high temperature oxidation catalysts and have been used by deposition on a porous support to increase the surface area and active centers of the material. Likewise, an oxide of a metal such as cobalt has been used as a catalyst for oxidation, but in each instance such free metals or oxides or any combinations are used in a process involving high temperatures which are maintained and constitutes an essential step in the method of use of the catalyst, such as in the manufacture of sulfuric anhydride. The oxidation temperature conditions for which the present invention is directed are such that these materials individually are not sufficiently active to completely oxidize the combustibles present in an engine exhaust gas mixture in all phases of its operation. It has been determined that a mixture of platinum and palladium in minute and equal proportions on a porous carrier reduces the temperature of complete combustion of carbon monoxide over either of the components by considerably more than one hundred degrees temperature on the centigrade scale.

A greater improvement is made which represents a preferred embodiment of the invention, by the use of a substance composed of a mixture of the two platinum metals of small proportion by weight of the mixture and cobalt oxide of much larger proportion by weight of the mixture supported on a suitable inert carrier. This material possesses greater oxidation activity at lower temperatures than any of the constituents or any mixture of two of the constituents including the platinum and palladium mixture. To illustrate the extent of improvement, each of the metal components and the improved material have been subjected to an atmosphere of heated carbon monoxide and oxygen with the result that each of the constituents alone or when one is mixed with another were not active to completely burn the carbon monoxide at a temperature as low as that possible with our proposed mixture which is as low as 200° C. However, it has been found that the platinum and palladium mixture gave the best results of the two component mixtures but its activity for complete combustion requires a temperature much higher than the material of the preferred embodiment in burning carbon monoxide. Also, representing another example of the relative low temperature activity of this material and another advantageous application of our material, it has been found that when subjected to a flow of air containing a hydrogen content less than 5% formed by the discharge of hydrogen in the operation of battery cells, the diluted hydrogen is burned or oxidized at temperatures comparable to 200° C. and to the extent that no detectable amount of hydrogen is present in the treated atmosphere.

Another important advantage accomplished by this invention is that a very small amount of platinum and palladium is necessary for providing the catalyst mixture and, in one instance, about ¼ gram of platinum and a like amount of palladium is used for each pound of commercial and usable high temperature catalyst material produced. The bulk of the material is made up of a suitable carrier for the mixture and it is necessary because of high temperature use that the supporting material be relatively inert, porous, and of a refractory nature capable of withstanding temperatures which may reach several hundred degrees centigrade. A suitable mesh should be used in order to provide intimate mixtures of the gas to be treated and the active surface centers of the catalyst. The material is deposited preferably on the carrier or support by saturating the support material with a solution of compounds of the catalyst and followed by drying and decomposition.

Another object of this invention is to provide a high temperature catalyst material active at reduced temperatures which is infusible, non-volatile and unchanged by high temperatures and which is relatively inexpensive and adaptable to commercial processes of manufacture and suitable for application to high temperature oxidation processes as in the treatment of exhaust gas previously described.

A preferred manner of making the improved catalyst and which represents a part of the invention provides a mixture of what is thought to be free or uncombined and finely divided platinum and palladium, each of a minor amount, and mixed with cobalt oxide of a materially greater amount. An example of one proportion commercially and successfully used is the use of .260 gram each of platinum and palladium and about 7½ grams of cobalt oxide for each pound of supported and usable catalyst material. In terms of per cent of weight of catalyst which includes the carrier for supporting the material, this is equal to about .05 of 1% of platinum and a like per cent of palladium and about 1.4% of cobalt oxide. The amount of each constituent depends somewhat upon the conditions of oxidation to be met, especially the initial temperatures of activity of the catalyst material, but practical limitations in cost of catalyst material for an application for which this invention was purposely made places a definite limit on the amounts which can be used practically.

The use of an oxide of cobalt in combination with the metals platinum and palladium is of importance since it has been found that should an oxide of copper, nickel, iron or manganese be substituted for cobalt oxide in the combination of the mixture of platinum and palladium, sufficient activity of the metal does not begin at as low a temperature under similar conditions as does the material containing cobalt. Consequently, cobalt oxide has some effect on the other constituents whether it be as a promoter or actually as an auxiliary catalyst. However, the oxides of these metals do lower the starting temperature of a mixture of platinum and palladium but not to as great an extent as cobalt.

In producing catalyst material in accordance with this invention, it has been proposed that some form of suitable refractory material be used which possesses the necessary physical characteristics. A refractory material produced by the Carborundum Co. of Niagara Falls, New York, under the trade name "Aloxite" contains for the most part aluminum oxide ($Al_2O_3$) combined with silicon dioxide and suitable bonding and vitrified agents of metal silicates. This material is supplied in small mesh size and has a porosity of about 34% and is believed to be completely inert to the oxidation process and can be commercially treated with the catalyst material by any of the available processes used for making an even distribution of the material over large surfaces and without interfering with the activation of the resulting substance.

A preferred method of adding the catalyst material to the carrier is by immersing the carrier material into a solution of the catalyst materials until the solution penetrates throughout the material. The time of penetration, of course, will be governed by the amount of catalyst solution and the character of and amount of carrier material immersed into the solution.

In providing a suitable solution, it is proposed that some form of thermally decomposable platinum compound, palladium compound and cobalt compound which can be activated by decomposition and soluble in water or any other suitable common solvent be used which decomposes at temperatures available so that substantially free and activated platinum, palladium and cobalt oxide are formed. An example of a composite water solution which produces the required proportions of constituents and by the use of which 60 to 70 cubic centimeters of the solution is added to each pound of the carrier of about 2 to 4 mesh size is to mix together equal volumes of a 1% solution of hydrated chloroplatinic acid ($H_2PtCl_6 \cdot 6H_2O$), .67% solution of palladium chloride ($PdCl_2$) and a 20% solution of hydrated cobalt nitrate ($Co(NO_3)_2 \cdot 6H_2O$). The carrier material is saturated with this solution and then dried at a temperature of about 100° C. After the drying is completed, the material is then heated to a decomposition temperature, which may be from about 300° C. to 800° C., and continued at this temperature until all of the oxides of nitrogen and halogens have been driven off.

The product chlorides of platinum and palladium and the product nitrate of cobalt decompose and leave a mixture of platinum, palladium and cobalt oxide supported on the carrier material. This decomposition renders the resulting material catalytically active or produces the active centers of the composite mixture to provide a sufficiently activated catalyst mixture. The compounds of each of the components selected are readily commercially available and decompose readily at these temperatures to provide the desired materials. However, it is not intended by this example to limit the compounds of the catalyst material which is produced by employing these specific compounds of catalyst metals because it is realized that other decomposable compounds can be used to provide the catalytically active metal or oxide. Powdered or finely divided active constituents can be mechanically mixed and deposited on the carrier. As previously explained, a substituent for cobalt oxide can be made of other oxides of metals including copper, manganese, iron and nickel to give improved results over the use of a mixture of metals of the platinum group. Such metals are within the range of atomic numbers of 25 to 29, inclusive, and because of such attained improvement are within the scope of this invention, although the improvement is not to as great an extent in the lower temperatures at which it may be desirable to have the high temperature catalyst material active.

The use of equal volumes of the solutions of compounds of the constituents is an advantage in manufacture and provides a suitable proportion of about four grams of platinum, a like amount of palladium and about 115 grams of cobalt oxide for each liter of catalyst solution. The resulting mixture, when deposited on a suitable carrier and so as to produce catalytically active centers over the surface of the carrier, is active at a starting temperature of about 200° C. to oxidize the combustible constituents in exhaust gas of an internal combustion engine. It is likewise active in burning or oxidizing hydrogen to water vapor at temperatures comparable to those for oxidizing combustibles in exhaust gases. In this connection, it is to be noted that the oxidation of combustibles in exhaust gas represents a difficult oxidizable fluid mass including carbon monoxide, hydrogen, unburned fuel and oil and decomposition products thereof in the presence of relatively large amounts of water vapor and discloses by this application some idea of oxidation activity of the material. Other applications of high temperature oxidation of combustibles within the range of activity of the improved catalyst material can be made.

Material of the preferred embodiment was used in an exhaust duct of a small tractor and the combustibles in the gas discharged were substantially completely oxidized. For this result, about one cubic inch of catalyst is used for each cubic inch of piston displacement of the engine. While it is obvious that this amount of material can be varied depending on flow conditions and performance of the engine, for most purposes this amount of material for each cubic inch of displacement of the engine will give satisfactory results. The catalyst material remained sufficiently active during an intermittent but continuous use for more than six months without any visible signs of deterioration of its activity under extreme high temperature conditions and without affecting the relatively low temperature catalytic activity. The operation of this type of an engine continuously for long periods during each day placed the catalyst material under severe temperature conditions but the high temperatures of the exhaust gases themselves and the heats evolved in oxidation did not thermally affect the activity or physical character of the material. The results showed substantially complete combustion during all phases of its operation, that is, in starting and during continuous operation. To illustrate other satisfactory uses, similar material has been used in the burning of hydrogen present in a respirable atmosphere in which the amount of hydrogen was less than 5%. The material was used for a period of several days and for long periods of time during each day. The water vapor content of the atmosphere averaged about 50%. The material was heated initially to a temperature of about 200° C. by auxiliary means and the exhaust atmosphere from the oxidation apparatus was reduced from the original 5% in hydrogen content to an amount less than that detectable on a hydrogen detector which is not more than a small fraction of a percent of hydrogen in the ordinary atmosphere.

It is not intended by the detailed description of the proportions of the constituents used in the one embodiment be a basis for any inference that the invention is restricted to these proportions except that these constituents and proportions do give the more improved results from the standpoints of cost and activity rate. Likewise, the compounds used for forming the depositions of individual constituents on to a porous support are not to be regarded as a limitation of the invention.

A detailed description of a means for use of the catalyst materials in the oxidation of combustibles in an atmosphere such as in the exhaust gases of an internal combustion engine or the oxidation or burning of hydrogen or any other combustibles in an atmosphere is not necessary because of the fact that apparatus has been designed previously to accommodate such a process such as illustrated in U. S. Patent 1,902,160 issued to Frazer et al. The process requires that sufficient oxygen be present for complete combustion and in the treatment of exhaust gases it is preferred that the air or oxygen be introduced so as to interfere as little as possible with the effect of heating that results by the exhaust gases contacting the catalyst material.

One apparatus used satisfactorily for the burning of exhaust gases consists merely of what might be termed an inspirator or injector placed in the exhaust conduit as closely as possible to the exhaust manifold of the engine. This inspirator consists of a nozzle shaped inlet surrounded by openings to the atmosphere and followed by a layer of the catalyst material. As exhaust gases under some pressure pass through the nozzle, the effect is to produce a suction that draws air into the inspirator and is mixed with exhaust gases just prior to their passage through the catalyst material. This apparatus is one of commercial construction for diluting gaseous or vapor fluids and it is not intended to form a material part of this invention and merely illustrates a successful application of the use of catalyst material in connection with the oxidation of exhaust gases.

In the case of treating atmosphere as in the burning of a small quantity of hydrogen to eliminate explosive mixtures contained in an ambient atmosphere at ordinary temperatures, generally the atmosphere contains sufficient oxygen for combustion and to burn the hydrogen the atmosphere is passed through the catalyst material heated to a sufficient starting temperature to cause oxidation or burning to substantially eliminate hydrogen from the atmosphere and then maintained at this temperature by the heat of oxidation and a supplemental auxiliary source. Although the invention does not have as many advantages for this application, yet it does require less energy for heating the atmosphere to be treated or the material and appears to give a more complete oxidation of the combustibles to be removed as illustrated in the treatment of atmosphere for removing hydrogen.

While the best results are accomplished by the use of three-part mixture, it is intended that the invention include a mixture of platinum and palladium in equal proportions by weight and deposited on a carrier in substantially the same proportions by weight of the total weight of the catalyst including the carrier material. The addition of the metal oxide to the platinum and palladium does give a material catalytic improvement to the two-part mixture, but for some purposes the omission of the metal oxide may give satisfactory results where a lower catalytic activity is not desired, but an activity lower than the activity of each of the components is essential and to the extent of being more than 100 degrees centigrade lower.

According to the provisions of the patent statutes we have explained the principle of our invention and have described what we now consider to represent its best embodiment. However, we desire to have it understood that within the scope of the appended claims, the invention may be practiced otherwise than as specifically described.

We claim:

1. An oxidizing catalyst capable of oxidizing carbon monoxide at temperatures materially lower than any of its constituents and comprising an intimate mixture of three finely divided catalyst materials, each of which is normally inactive at the lower temperature, the materials being a mixture of catalyst platinum metals with an oxide of a metal having an atomic number within the range of 25 to 29, inclusive and each of the platinum metals in the mixture being of an amount affecting the catalytic properties of the mixture.

2. A high temperature oxidizing catalyst capable of oxidizing combustibles substantially completely in exhaust gas of an internal combustion engine and at all temperatures of phases of operation and comprising an intimate mixture of platinum metals in substantially equal weight proportions and combined with an oxide of a catalytically active metal and the mixture being deposited uniformly over the surface of a porous, refractory supporting material.

3. A high temperature oxidizing catalyst capable of oxidizing carbon monoxide completely at temperatures as low as 200 degrees centigrade and comprising a mixture of platinum metals and an oxide of a catalyst metal having an atomic number within the range of 25 to 29, inclusive, each of the platinum metals in the mixture being of an amount affecting the catalytic properties of the mixture, and the mixture being deposited on a relatively inert, infusible, refractory and porous supporting material.

4. A high temperature oxidizing catalyst capable of oxidizing completely combustibles in the exhaust gas of an internal combustion engine and at all temperatures of phases of operation of the engine and comprising a mixture of platinum and palladium in substantially equal weight proportions and combined with a greater weight proportion of an oxide of a catalyst metal and having an atomic number between the range of 25 and 29, inclusive, and being deposited on relatively inert, infusible, refractory and porous supporting material composed for the most part of an oxide of aluminum.

5. A high temperature oxidizing catalyst capable of oxidizing completely carbon monoxide at temperatures as low as 200 degrees centigrade and as high as the temperature of exhaust gas encountered in the phases of operation of an internal combustion engine comprising a mixture composed of platinum and palladium in substantially like amounts by weight and each being of a minor proportion by weight of the mixture and an oxide of cobalt of a major proportion by weight of the mixture and the mixture being deposited on a relatively inert, infusible, refractory and porous supporting material.

6. A high temperature oxidizing catalyst capable of oxidizing completely carbon monoxide at temperatures as low as 200 degrees centigrade and as high as temperatures of exhaust gas encountered in the operation of an internal combustion engine comprising a mixture composed of finaly divided platinum and palladium in substantially equal proportions by weight and constituting a minor proportion by weight of the mixture and of an oxide of cobalt of a weight constituting a major proportion of the mixture and the mixture being deposited on a relatively inert, infusible, refractory and porous supporting material by precipitation and decomposition of a liquid mixture composed of substantially equal volumes of a 1% solution of hexachloroplatinic acid, a .67% solution of palladium chloride and a 20% solution of hydrated cobalt nitrate.

7. The method of continuously and completely oxidizing a combustible gas or vapor at relatively high temperatures comprising passing a stream of said gas or vapor and oxygen into contact with a catalyst comprising a mixture of finely divided platinum metals combined with an oxide of a metal having an atomic number within the range of 25 and 29, inclusive, each of the platinum metals in the mixture being of an amount affecting the catalytic properties of the mixture, and the mixture being deposited on suitable supporting material.

8. The method of continuously and completely oxidizing a combustible gas or vapor at relatively high temperatures comprising passing a stream of said gas and vapor and oxygen into contact with a catalyst comprising a relatively small amount of a mixture of two platinum metals combined with a relatively larger amount of a catalytically active oxide of a metal having an atomic number within the range of 25 and 29, inclusive and each of the platinum metals in the mixture being of an amount affecting the catalytic properties of the mixture.

9. The method of continuously and completely oxidizing a combustible gas or vapor at high temperatures comprising passing a stream of said gas or vapor and oxygen into contact with a catalyst comprising a mixture of finely divided platinum and palladium disseminated in artificially prepared and finely divided oxide of cobalt and the mixture being deposited on a suitable supporting material.

10. The method of continuously and completely oxidizing a combustible gas or vapor comprising passing a stream of said gas or vapor and oxygen into contact with a catalyst comprising a mixture deposited on a relatively inert, porous refractory supporting material of finely divided and uncombined platinum and palladium resulting from the decomposition of a compound of each metal when subjected to high temperatures and disseminated in an artificially prepared oxygen compound of cobalt resulting from the high temperature decomposition of commercial hydrated cobalt nitrate.

11. The method of continuously and completely oxidizing a combustible gas or vapor comprising passing a stream of said gas or vapor and oxygen into contact with a catalyst comprising an intimate supported mixture of substantially equal weights of catalytically active platinum and palladium combined with an amount of cobalt oxide greater than the combined weights of platinum and palladium and produced by high temperature decomposition of commercial hydrated cobalt nitrate.

12. The method of continuously and completely oxidizing a combustible gas or vapor comprising passing a stream of said gas or vapor and oxygen into contact with a catalyst comprising a mixture of finely divided platinum and palladium in substantially equal proportions by weight combined with a proportion of cobalt oxide greater than the combined weights of platinum and palladium supported on a suitable carrier and formed by high temperature decomposition of suitable compounds of platinum, palladium and cobalt.

13. The method of continuously and completely oxidizing a combustible gas or vapor comprising passing a stream of said gas or vapor and oxygen into contact with a catalyst comprising a mixture of platinum and palladium in substantially equal proportions by weight and a substantial amount of cobalt oxide and the mixture being formed by subjecting the resulting precipitate of a common solution of chlorides of platinum and palladium and a nitrate of cobalt to a temperature of from 300° to 800° C. for a sufficient period of time to decompose the compounds and form an activated mixture of finely divided platinum, palladium and cobalt oxide.

14. The method of preparing a high temperature catalyst which comprises the steps of combining substantially equal volumes of a 1% solution of chloroplatinic acid, .67% solution of palladium chloride and a 20% solution of hydrated cobalt nitrate, immersing a suitable refractory and porous support into the solution, retaining the support in the solution for a sufficient period of time so that the solution is able to penetrate throughout the supporting material, withdrawing the support from the solution and subjecting the resulting mass to high temperatures to evaporate the solvent and deposit the metal resulting high temperature catalyst material uniformly over the surface area of the supporting material.

OWEN G. BENNETT.
ALFRED VAN ANDEL.